United States Patent
Scoggins et al.

(10) Patent No.: US 8,727,291 B2
(45) Date of Patent: May 20, 2014

(54) APPARATUS FOR SECURING PANELS TO SUBSTRATES

(75) Inventors: David B. Scoggins, Georgetown, TX (US); Robert S. Balog, Jr., College Station, TX (US)

(73) Assignee: Sundance Renewable Solutions, Inc., Georgetown, TX (US)

( * ) Notice: Subject to any disclaimer, the term of this patent is extended or adjusted under 35 U.S.C. 154(b) by 261 days.

(21) Appl. No.: 13/277,179

(22) Filed: Oct. 19, 2011

(65) Prior Publication Data

US 2012/0090139 A1    Apr. 19, 2012

Related U.S. Application Data

(60) Provisional application No. 61/394,733, filed on Oct. 19, 2010.

(51) Int. Cl.
*A47B 96/00* (2006.01)

(52) U.S. Cl.
USPC ............ 248/226.11; 248/231.71; 269/143; 269/249; 29/276; 29/257

(58) Field of Classification Search
USPC ........ 248/226.11, 227.4, 228.1, 228.6, 230.1, 248/230.6, 231.71, 231.85, 689, 316.1, 248/316.2, 316.7; 24/525, 569; 29/276, 29/257; 269/143, 249
See application file for complete search history.

(56) References Cited

U.S. PATENT DOCUMENTS

| | | | | |
|---|---|---|---|---|
| 2,399,714 | A * | 5/1946 | Wasilewski | 269/249 |
| 2,671,482 | A * | 3/1954 | Gordon | 269/182 |
| 2,896,893 | A * | 7/1959 | Oliver | 248/208 |
| 2,903,929 | A * | 9/1959 | McVey | 72/399 |
| 3,596,898 | A * | 8/1971 | Hilburn | 269/243 |
| D260,235 | S * | 8/1981 | Anderson et al. | D8/394 |
| 4,363,475 | A * | 12/1982 | McCarty | 269/69 |
| 4,649,614 | A * | 3/1987 | Lund | 29/257 |
| 6,431,534 | B1 * | 8/2002 | Orosz et al. | 269/43 |
| 7,980,580 | B2 * | 7/2011 | Loewenthal et al. | 280/304.1 |

* cited by examiner

*Primary Examiner* — Alfred J Wujciak
(74) *Attorney, Agent, or Firm* — Blanchard & Associates

(57) ABSTRACT

An apparatus is provided for securing a panel to a substrate. The apparatus includes a base member, and an attachment member for securing the base member to the substrate. The apparatus further includes a clip member including a U-shaped member and an angle-sided member. The U-shaped member includes a central portion and first and second walls defining a generally U-shaped access region for accepting the angle-sided member. At least one of the first and second walls includes a longitudinal flange extending laterally outwardly from an upper end thereof. Each of the U-shaped member and the angle-sided member includes a corresponding hole for accepting the attachment member therethrough. The apparatus further includes a securing member for pressing the longitudinal flange against at top edge portion of the panel.

10 Claims, 13 Drawing Sheets

APPARATUS FOR SECURING PANELS TO SUBSTRATES

RELATED APPLICATION

This application claims the benefit of U.S. Provisional Application No. 61/394,733, filed on Oct. 19, 2010, which is herein incorporated by reference in its entirety.

BACKGROUND

Unless otherwise indicated herein, the materials described in this section are not prior art to the claims in this application and are not admitted to be prior art by inclusion in this section.

Photovoltaic (PV) modules are typically configured to produce electricity most efficiently from direct sunlight. Mounting hardware for PV modules has been designed to reliably mount and expose PV modules to direct sunlight by attaching them to unobstructed buildings, vehicles, or structures. While there have been a number of recent developments in the field of building integrated PV systems, there are still issues with their installation, such as ease of orientation issues, PV module alignment issues, ventilation issues, servicing issues, and inability to work well in retrofit applications.

Numerous systems have been devised to mitigate these issues, but most have resulted in costly and cumbersome mounting hardware. One such system is disclosed in U.S. Pat. No. 6,672,018 ('018) to Shingleton. The '018 patent discloses a solar collector array formed of a plurality of solar panels mounted on a frame made of support beams which may be sheet metal channel members. A butyl tape or other glazing material is applied between the back laminate of the solar panel and the beam. Clips are used to clamp the panels to the support beams. The clips have an upper portion that is generally T-shaped in profile, and a retainer in the form of a channel nut or bar, with a threaded hole that receives a bolt or similar threaded fastener. The retainer biases against the inwardly directed flanges of the channel support beam. Electrical wires and mechanical fasteners are concealed within the support beams.

Therefore, a definite need exists for a simple, cost-effective, attachment apparatus which provides the ability to secure panels to different substrates while providing ease of installation, orientation, and removal from the substrates.

SUMMARY

According to a particular aspect, an apparatus is provided for securing a panel, such as a PV panel, to a substrate.

An apparatus is provided for securing a panel to a substrate. The apparatus includes a base member, and an attachment member for securing the base member to the substrate. The apparatus further includes a clip member including a U-shaped member and an angle-sided member. The U-shaped member includes a central portion and first and second walls defining a generally U-shaped access region for accepting the angle-sided member. At least one of the first and second walls includes a longitudinal flange extending laterally outwardly from an upper end thereof. Each of the U-shaped member and the angle-sided member includes a corresponding hole for accepting the attachment member therethrough. The apparatus further includes a securing member for pressing the longitudinal flange against at top edge portion of the panel.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the invention by way of example only and not by way of limitation.

BRIEF DESCRIPTION OF FIGURES

To understand the present disclosure, it will now be described by way of example, with reference to the accompanying drawings in which.

DETAILED DESCRIPTION

While the present invention may be embodied in various forms, there will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
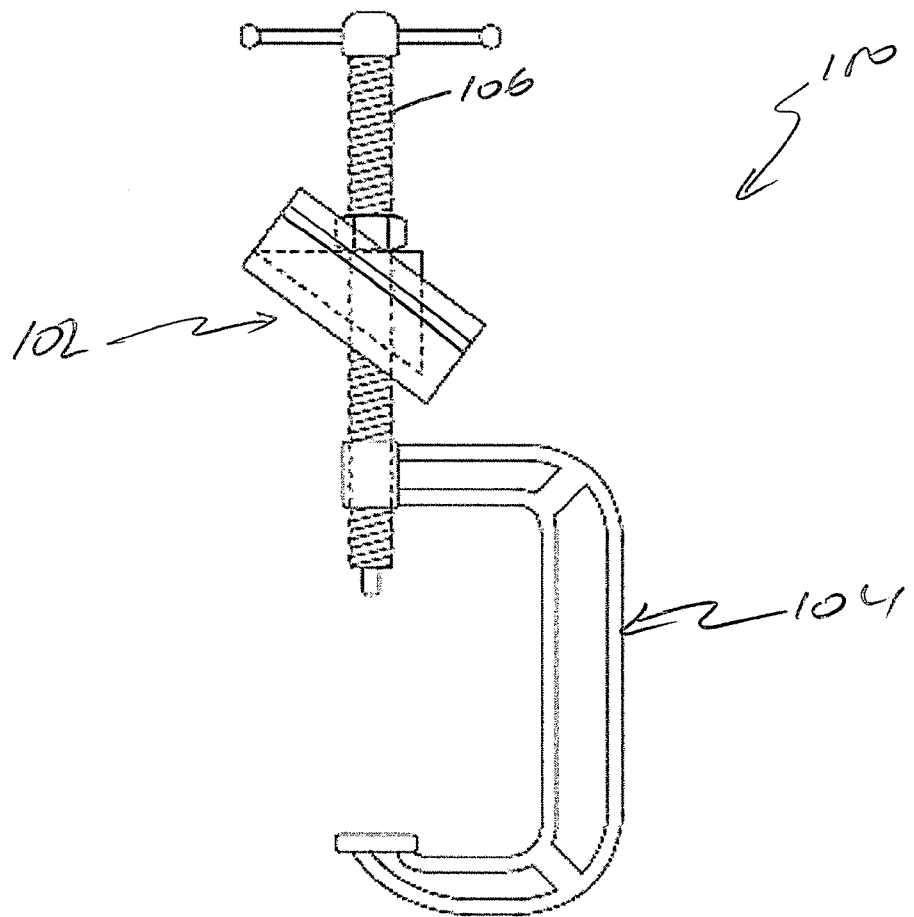
FIG. 1 is an elevational side view of an embodiment of an apparatus for securing a panel to a substrate.
Figure 2:
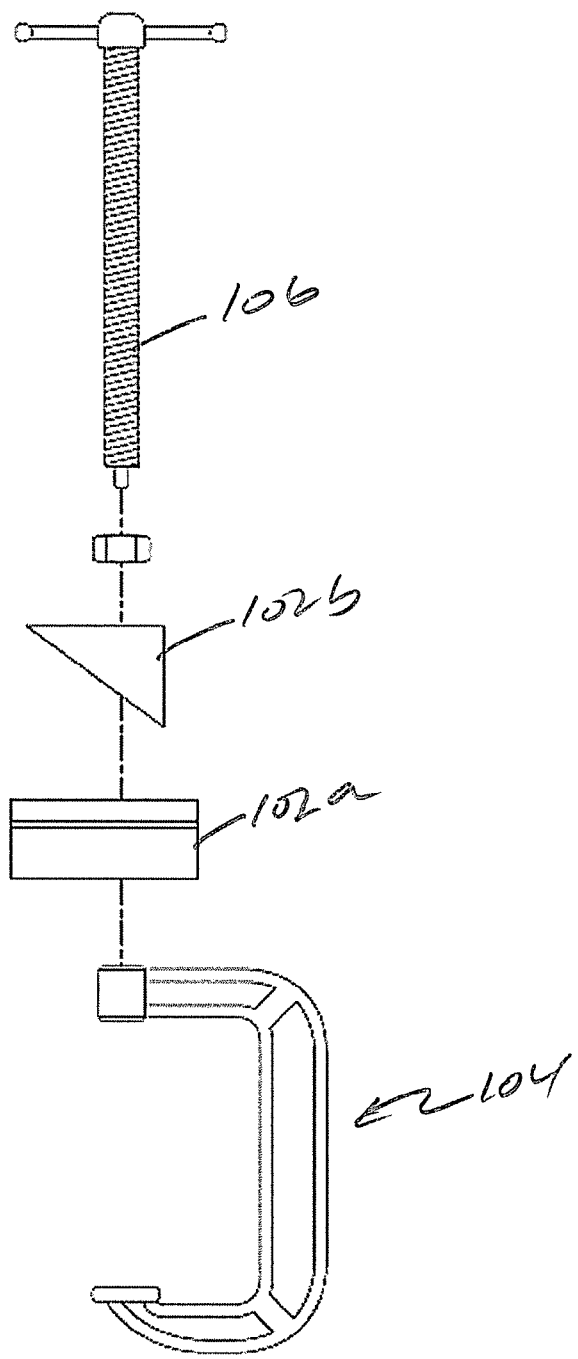
FIG. 2 is an exploded side view of the apparatus of FIG. 1.
Figure 3:
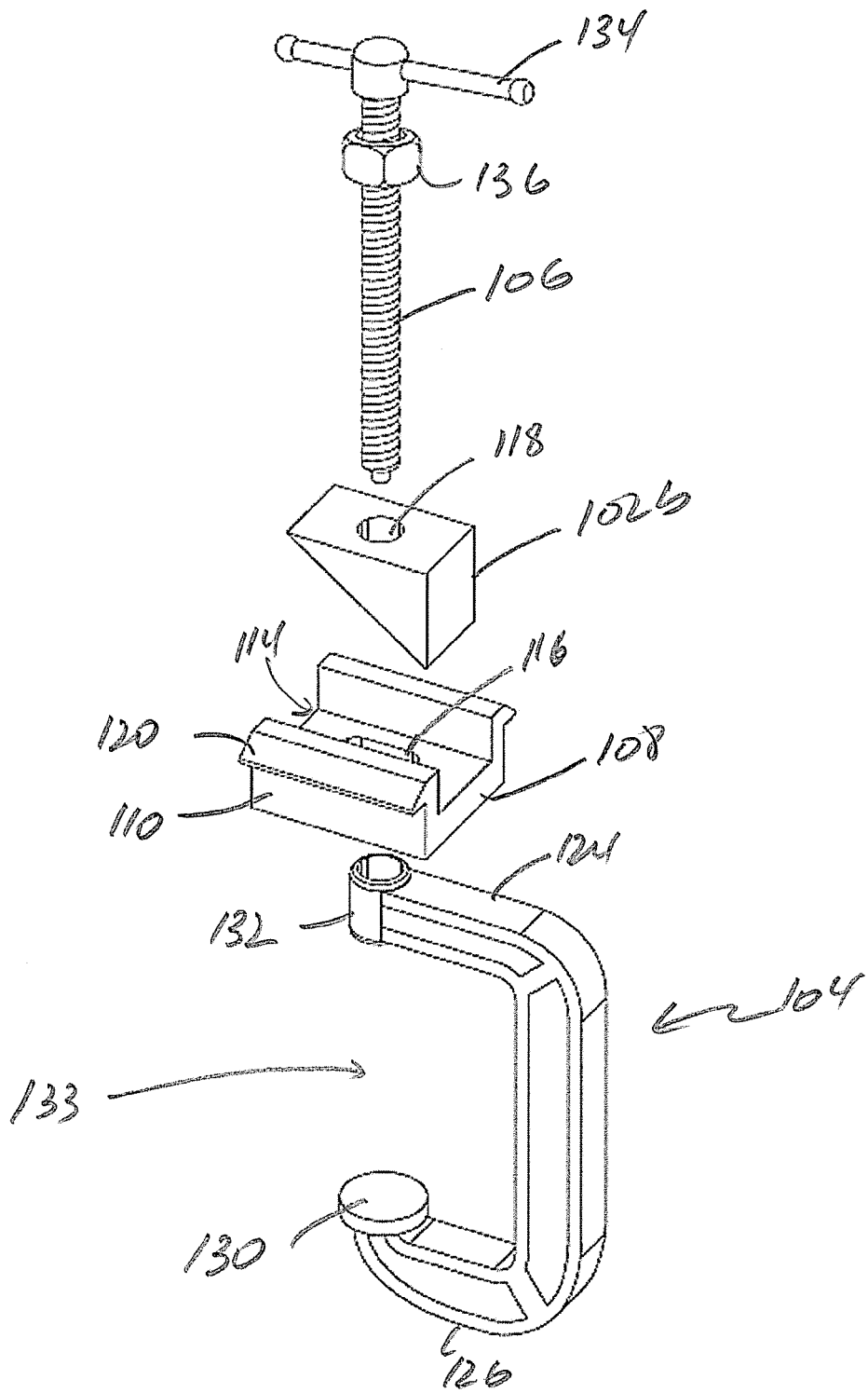
FIG. 3 is an exploded perspective view of the apparatus of FIG. 1.

Referring to FIGS. 1-3, there is shown an embodiment of an apparatus or assembly 100 for securing a panel, such as a PV panel, to a substrate. As shown, apparatus 100 includes a clip assembly 102 and a C-shaped body, frame or clamp 104, coupled to each other through a screw or bolt 106. Clip assembly 102 includes clip 102a, having a generally U-shaped structure, and an angle-sided or generally triangular member 102b. U-shaped clip 102a has a central portion 108, and a pair of raised portions or walls 110. Central portion 108 and raised walls 110 define an access region 114. Access region 114 is accessible from two (2) longitudinal sides and from above to enable unobstructed access to triangular member 102b and to bolt 106. Raised walls 110 can be substantially perpendicular to central portion 108. Alternately, raised walls 110 can extend inwardly or outwardly over central portion 108.

Central portion 108 includes a hole 116 formed therein for receipt there-through of bolt 106, and triangular member 102b includes a hole 118 for receipt there-through of bolt 106, thus facilitating the coupling of clip assembly 102 to C-shaped frame 104 via bolt 106. Raised walls 110 include longitudinal flanges 120 extending substantially laterally away from access region 114. Alternately, flange 120 may be configured to extend from wall 110 in a slight downward direction, instead of forming a substantially right angle with a direction of wall 110.

C-shaped frame 104 includes a top frame portion 124 and a bottom frame portion 126, spanned by an intermediate frame portion 128. Bottom frame portion 126 is terminated by a bottom clamp seat 130. Top frame portion 124 carries at its end, distant from the frame portion 128, a threaded hole or an internally threaded housing 132 having a generally cylindrical shape. Bottom clamp seat 130 and threaded housing 132 are separated by an opening 133, whose size is selected to be at least slightly wider that a thickness of a substrate to which a panel is to be secured.

A cross-handle 134 is slideably mounted in a transverse bore through the top end of bolt 106, and a nut 136 is threaded on bolt 106 to be positioned between the triangular member 102b, positioned within access region 114 of clip 102a, and cross-handle 136. During operation, elongated bolt 106 can adjustably penetrate through internally threaded housing 132 to press an object, such as a substrate, via a free bottom end of bolt 106 against bottom clamp seat 130.

Figure 4:
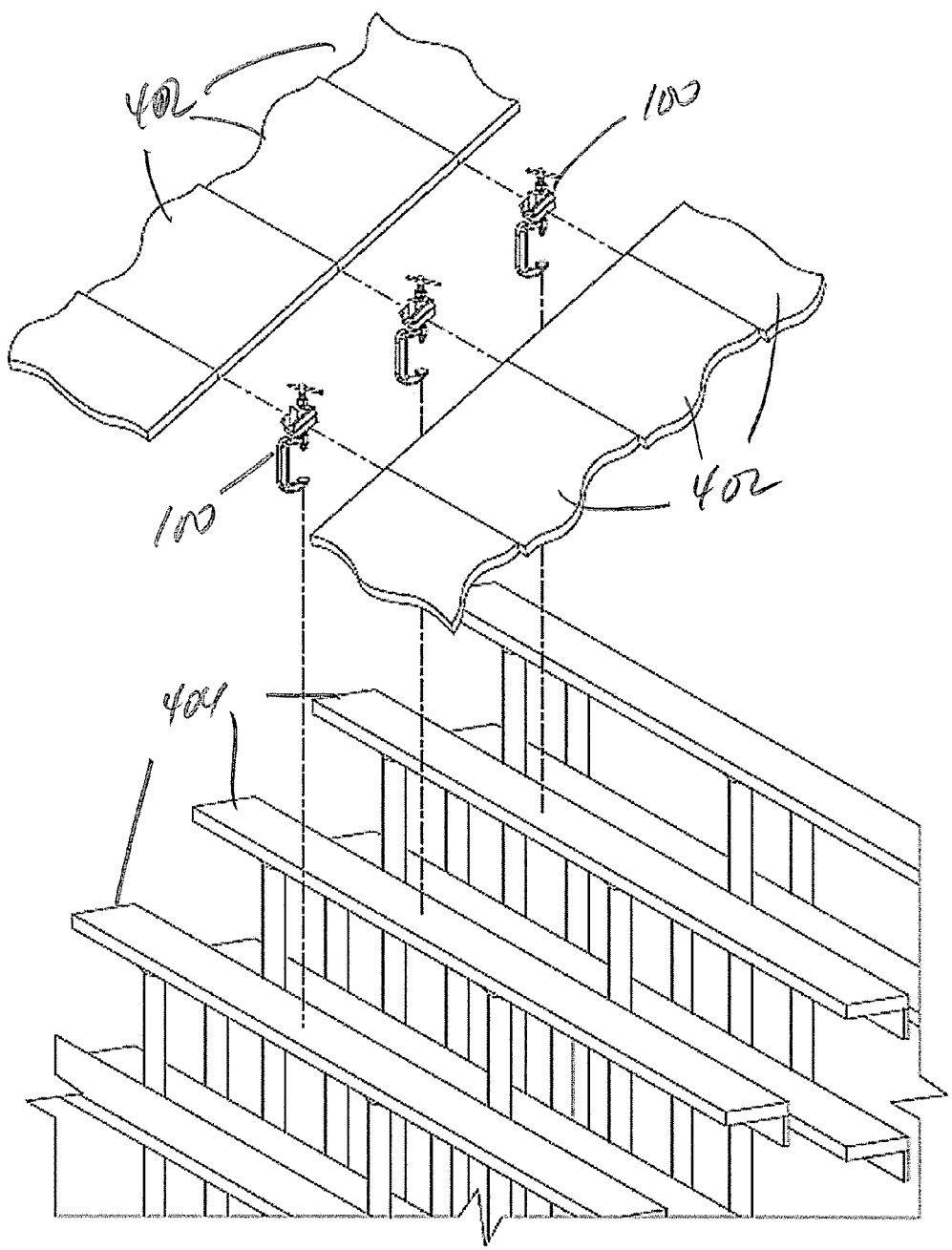
FIG. 4 is an exploded view of panels secured to a plurality of benches via a plurality of the apparatuses of FIG. 1.
Figure 5A:
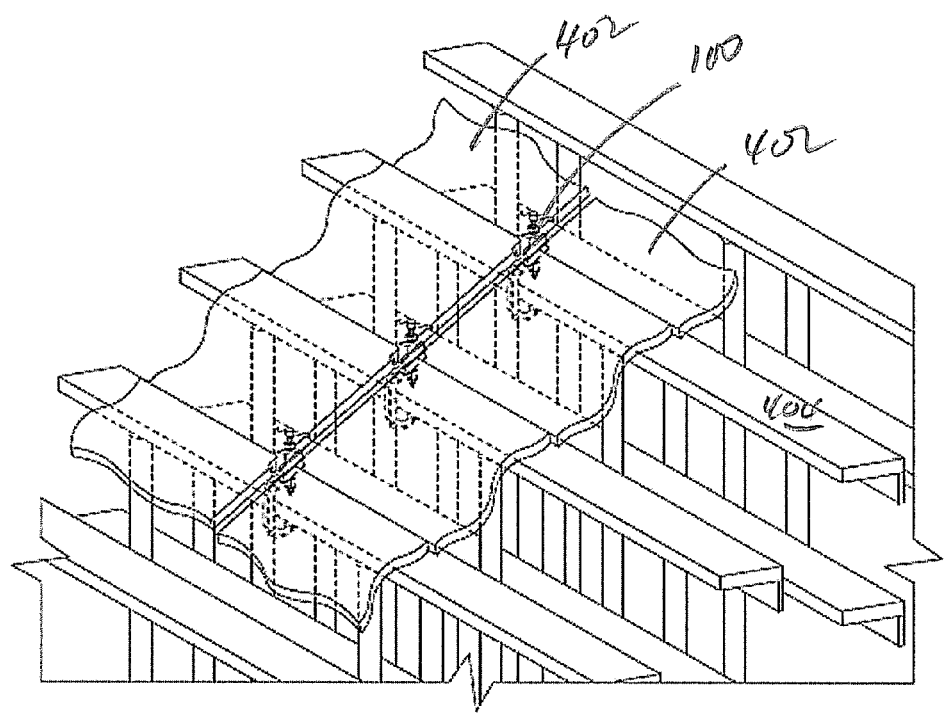
FIG. 5A illustrates a partial perspective view of a plurality of panels secured to a plurality of benches via a plurality of apparatuses of FIG. 1.
Figure 5B:
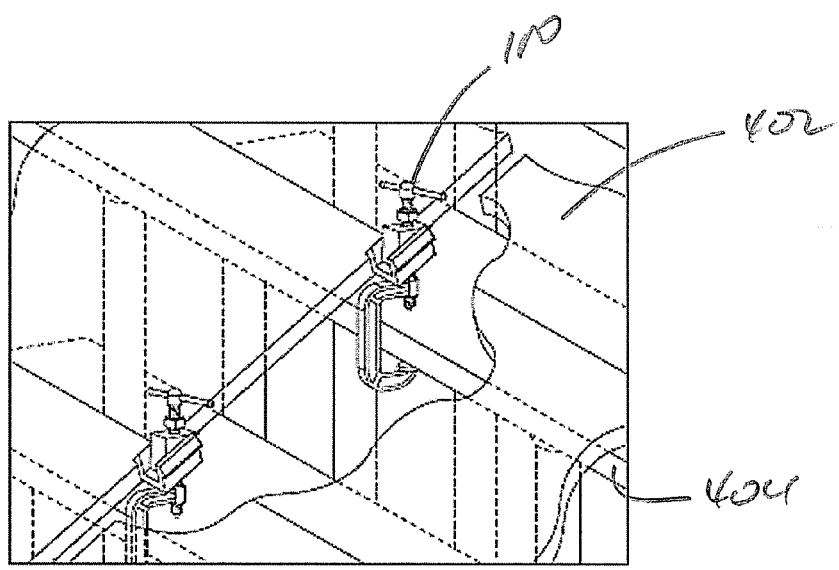
FIG. 5B illustrates a partial open perspective view of the plurality of panels secured to a plurality of benches via the plurality of apparatuses of FIG. 1.

Now referring to FIGS. 4, 5A and 5B, a plurality of assemblies 100 are used to secure a plurality of panels 402 to a plurality of benches or seating substrates 404. As best seen in FIGS. 5A and 5B, C-shaped frames 104 and bolts 106 are used to securely affix the corresponding assemblies 100 to benches 404. By tightening nuts 136, clip assemblies 102 are biased, via flanges 120, against top ends or edges of panels 402 while bottom surfaces of panels 402 are pressed against benches 404. For this securing of panels 402 to benches 404, triangular members 102b are configured to have one of their respective internal angles match the vertical angle formed by an oblique straight line connecting consecutive forward edges of vertically adjacent benches 404 and a horizontal line sharing a vertical plane with the oblique straight line.

In another embodiment, triangular member 102b is configured to include a manually adjustable internal angle. For this embodiment, triangular member 102b may include an internal mechanism, controlled manually externally, that adjusts the adjustable internal angle so as to match it to an incline angle of the substrate to which assembly 100 is to be secured.

In yet another embodiment, triangular member 102b is configured to include an automatically adjustable internal angle. For this embodiment, triangular member 102b may include an internal mechanism that automatically adjusts, during operation, the adjustable internal angle to an incline angle of the substrate to which assembly 100 is being secured.

Figure 6:
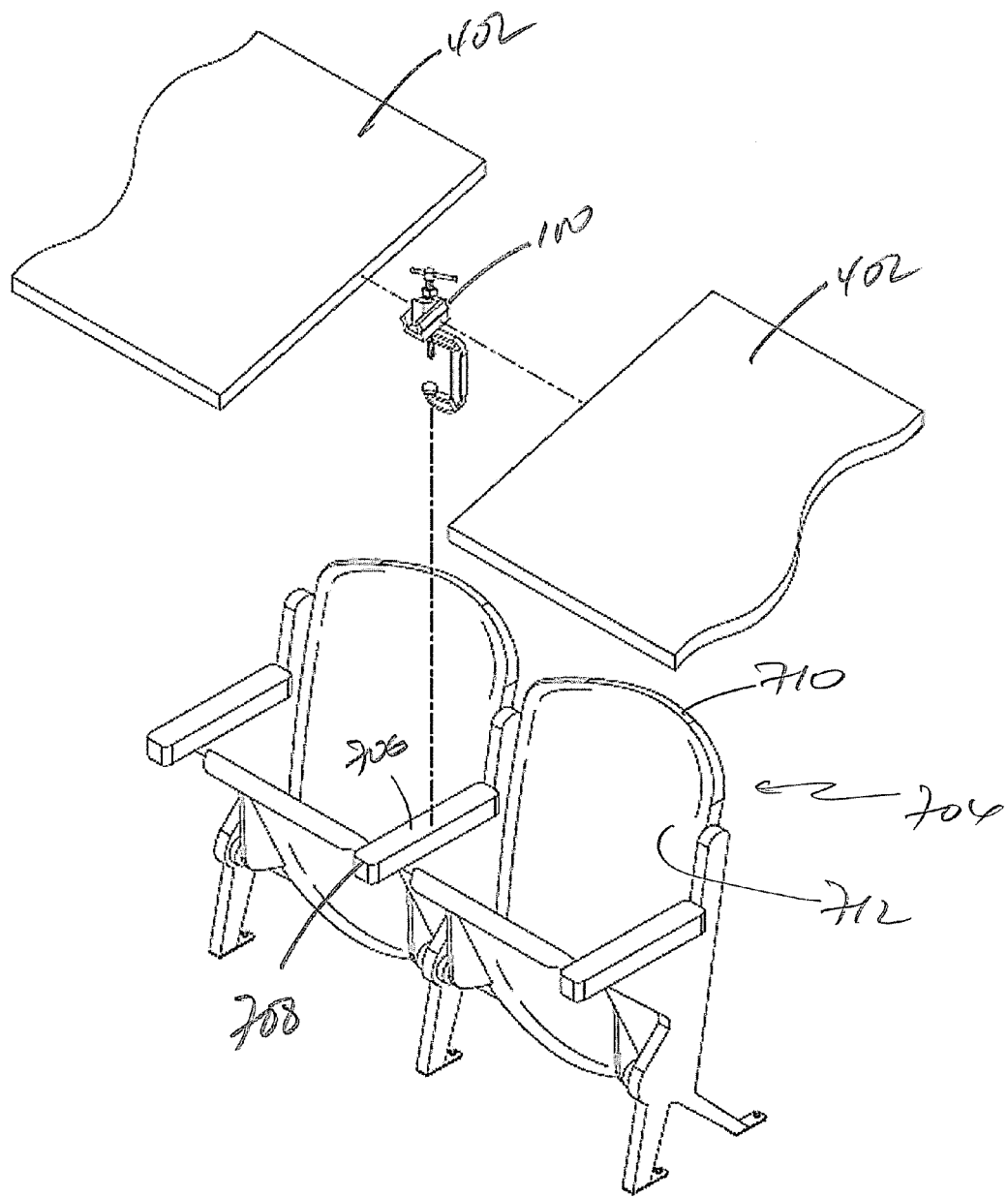
FIG. 6 is an exploded view of a couple of panels to be secured to an arm chair via the apparatus of FIG. 1.
Figure 7A:
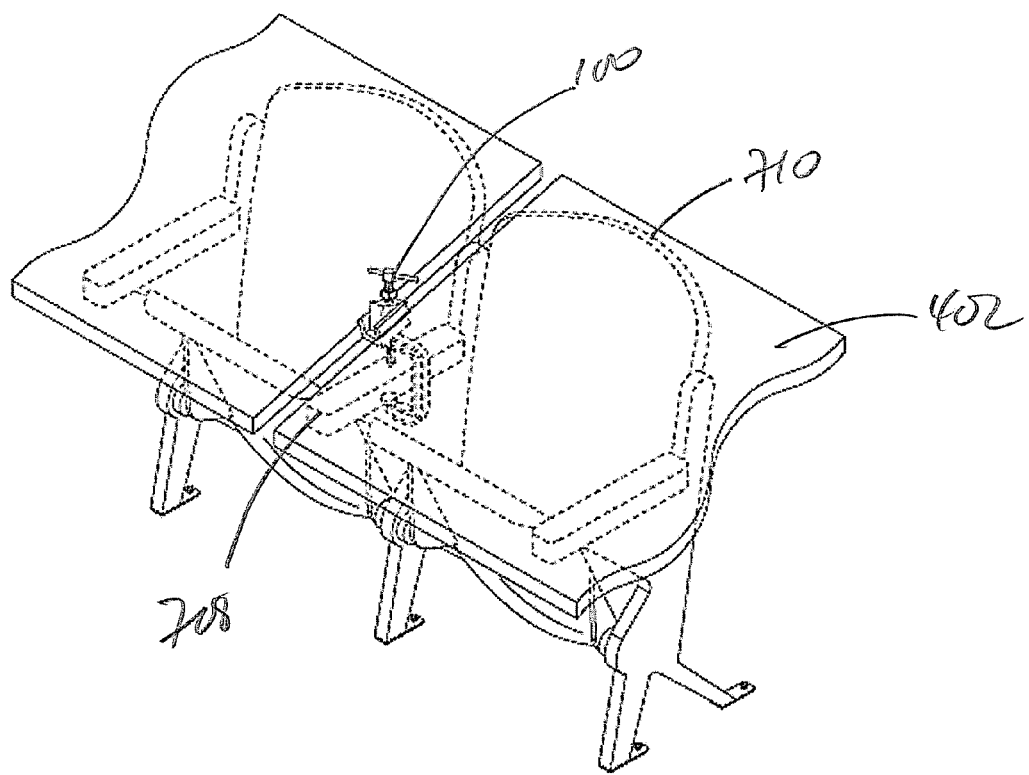
FIG. 7A illustrates a partial perspective view of the couple of panels secured to the arm chair of FIG. 6 via the apparatus of FIG. 1.
Figure 7B:
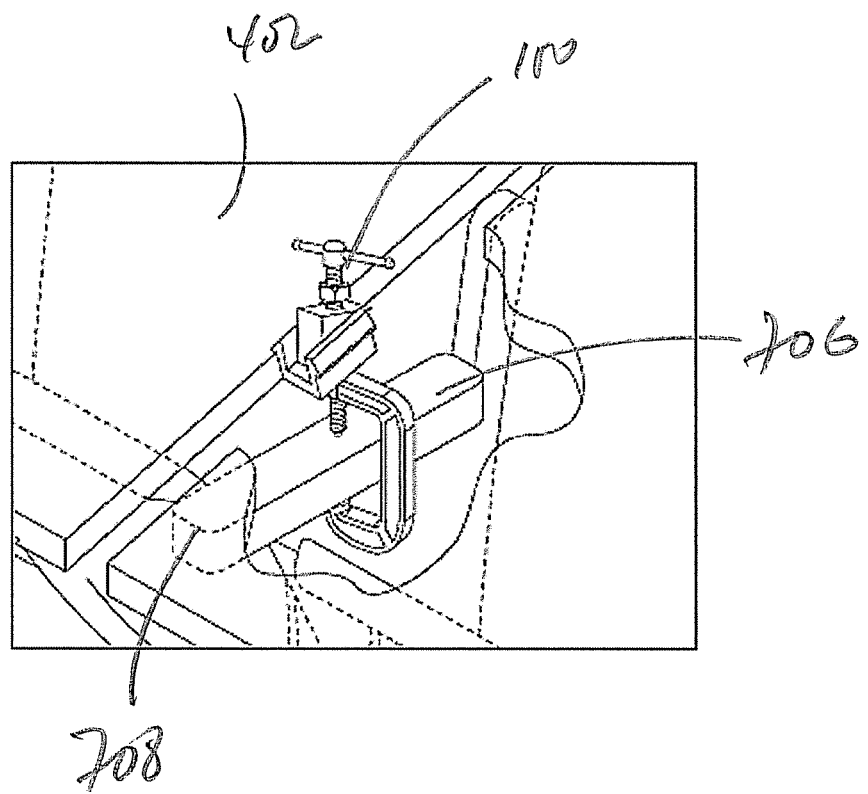
FIG. 7B illustrates a partial open perspective view of the couple of panels secured to the arm chair of FIG. 6 via the apparatus of FIG. 1.

Now referring to FIGS. 6, 7A and 7B, assembly 100 is used to secure a couple of panels 402 to a couple of adjacent seats 704. As best seen in FIGS. 7A and 7B, C-shaped frame 104 and bolt 106 are used to securely affix assembly 100 to a seat arm 706 separating adjacent seats 704. By tightening corresponding nuts 136, clip assemblies 102 are biased, via flanges 120, against top ends or edges of panels 402, while bottom surfaces of panels 402 are pressed against both a forward edge 708 of seat arm 706 and a top end 710 of a seat back 712.

Triangular members 102b, selected for this securing of panels 402 to seats 704, have one of their respective internal angles match the vertical angle formed by an oblique straight line connecting forward edges of arm 706 and top end 710 and a horizontal line sharing a vertical plane with the oblique straight line. Alternately, as discussed above, triangular members 102b, selected for this securing of panels 402 to seats 704, may have a manually adjustable internal angle or an automatically adjustable angle so match the incline angle of the line connecting forward edges of arm 706 and top end 710.

Figure 8:
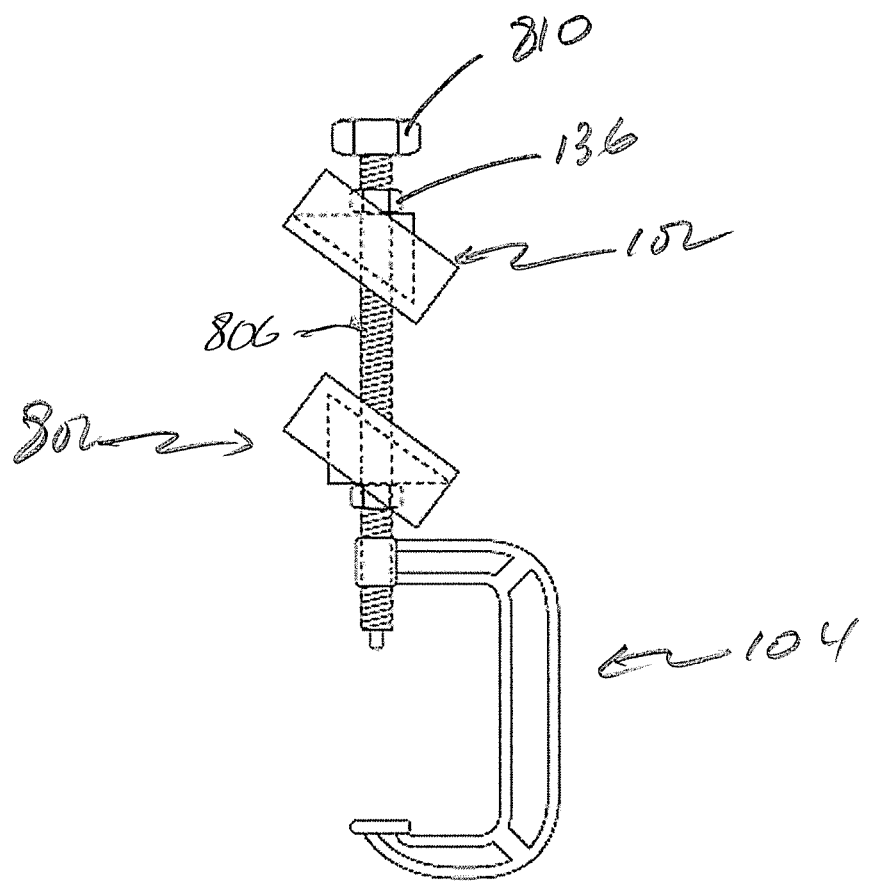
FIG. 8 is an elevational side view of an alternate embodiment of an apparatus for securing a panel to a substrate.
Figure 9:
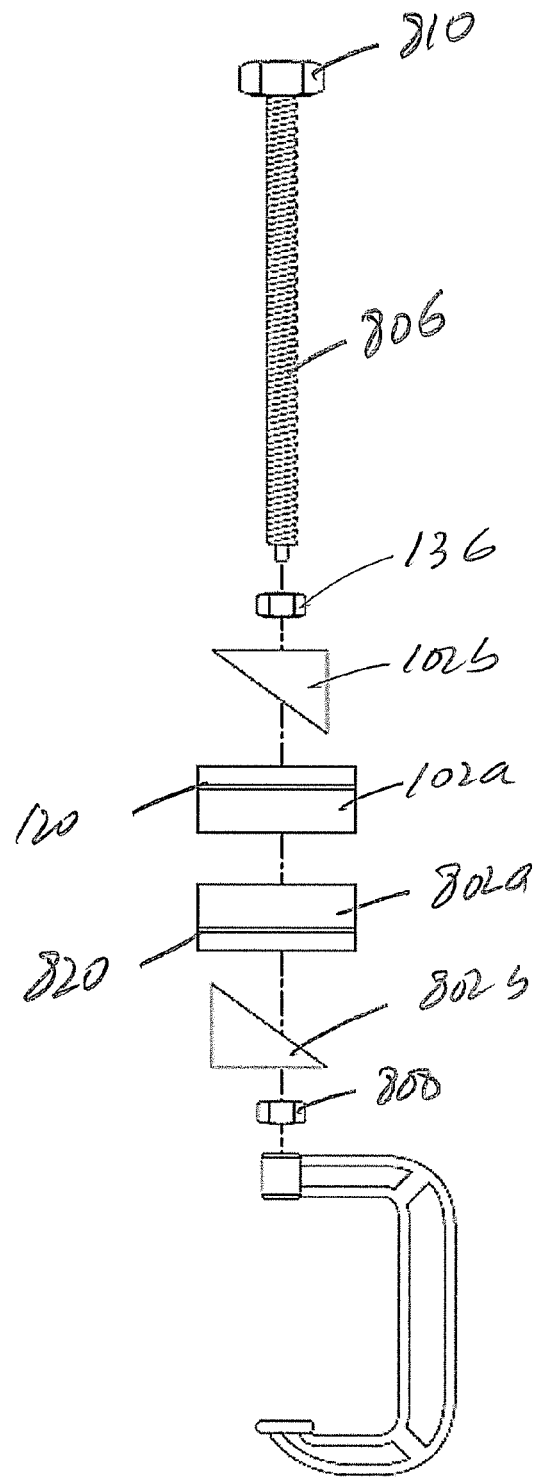
FIG. 9 is an exploded side view of the alternate embodiment of FIG. 8.

Now referring to FIGS. 8 and 9, an embodiment of an alternate assembly 800 is shown. Assembly 800 is substantially assembly 100 augmented with an additional clip assembly 802, an alternate bolt 806, and an additional nut 808. When assembly 800 is used to securely affix a panel to a substrate, clip assemblies 102 and 802 are biased against top edges and bottom edges of the panel, respectively, via nuts 136 and 808, respectively. Clip assembly 802 is similar to assembly clip 102, in that it includes a clip 802a and a triangular member 802b. Triangular member 802b preferably has one internal angle equal to that of triangular 102b, when they are used together to hold or capture a panel, having sides with substantially parallel edges, therebetween flanges 120 and 820, of clips 102a and 802a, respectively.

Figure 10:
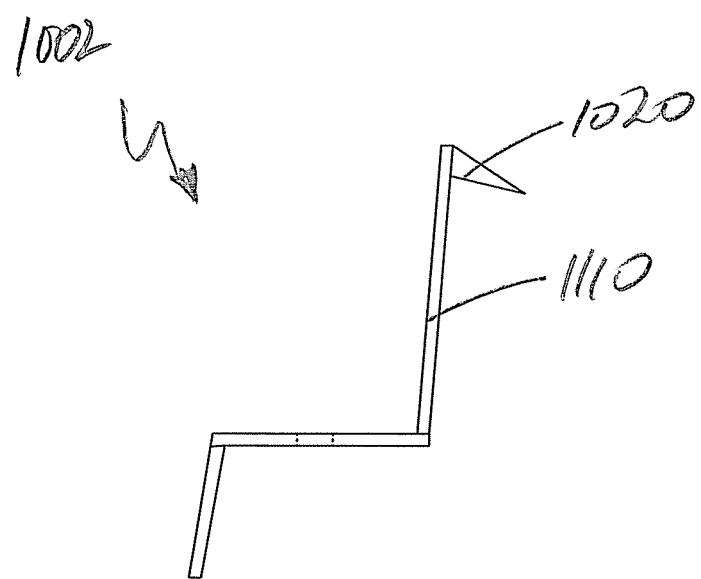
FIG. 10 is a front view of a clip having only one wall extending upward.

Now referring to FIG. 10, an embodiment of another alternate assembly 1000 is shown. Assembly 1000 is configured to have a different clip 1002 than that of assembly 100. Unlike assembly 100, assembly 1000 is configured to include only one raised wall 1110. Assembly 1000 is configured to be used to secure an end panel to a substrate. As such, assembly 1000 includes only one flange 1020 to be in contact with the end panel.

Figure 11:
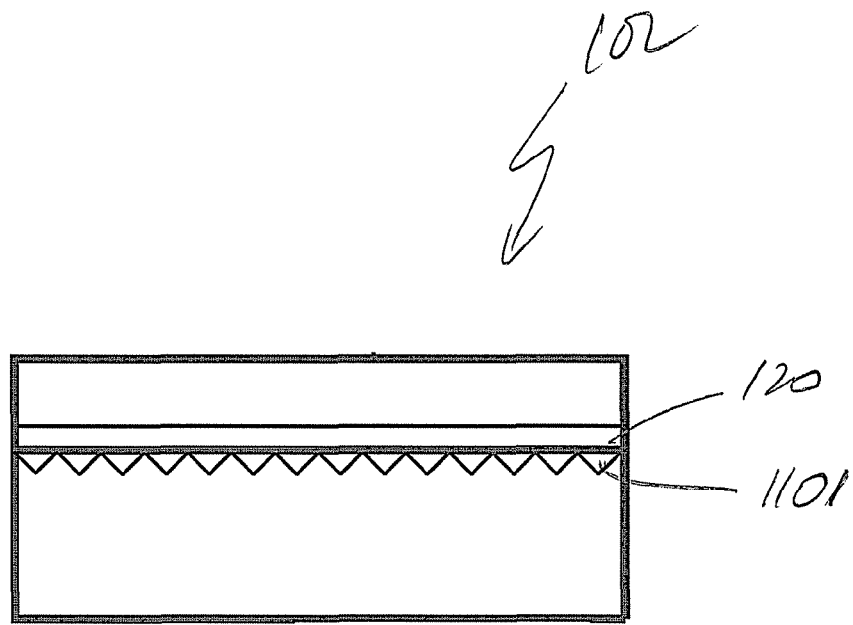
FIG. 11 is a side view of another alternate embodiment of an apparatus having a flange that includes teeth.

Now referring to FIG. 11, a side view of an embodiment of assembly 100, 800 or 1000 is shown. Typically, a PV panel includes a circumferential frame (not shown), having a substantially U-shaped cross-section, that surrounds it preferably from all sides. To improve the securing of the panel, flanges 120, 820 and 1020 of clips 102a, 802a and 1002a, respectively, may include teeth 1101 that point substantially downward. As such, during the securing of assembly 100, 800 or 1000 to a substrate, flanges 120, 820 or 1020 are engaged to the circumferential frame via teeth 1101.

In another embodiment, to ensure good grounding of a PV panel, for example, each element or member of assembly 100 is formed of conductive material or at least includes or is covered with a conductive outer surface. As such, teethed clip 102a, bolt 106 and C-shaped frame 104 provide an electrical connection between a PV panel and a conductive supporting substrate, to ensure good grounding of the PV panel. Alternately, if the supporting substrate is formed of a non-conductive material, assembly 100 may be equipped with a grounding electrical wire (not shown) that may extend to a grounding element.

While certain embodiments of the present invention have been described, it will be appreciated that changes and modifications can be made and that other embodiments may be devised without departing from the true spirit and scope of the invention.

The invention claimed is:

1. An apparatus for securing a panel to a substrate, comprising:
    a base member comprising a clamp;
    an attachment member for securing the substrate within an opening of the base member;
    a clip member comprising a U-shaped member and an angle-sided member, wherein the U-shaped member includes a central portion and first and second walls defining a generally U-shaped access region for accepting the angle-sided member, wherein at least one of the first and second walls includes a longitudinal flange extending laterally outwardly from an upper end thereof, wherein each of the U-shaped member and the angle-sided member includes a corresponding hole for accepting the attachment member therethrough, and wherein an angle of the angle-sided member is selected to match an incline angle at which the panel is secured to the substrate; and a securing member for pressing the longitudinal flange against a top edge portion of the panel, thereby securing the panel to the substrate, wherein the securing member is positioned between the angle-sided member and a top end of the attachment member.

2. The apparatus of claim 1, wherein the clamp comprises a C-shape frame.

3. The apparatus of claim 2, wherein the C-shape frame includes a threaded housing at an upper end portion, and wherein the attachment member is an elongated bolt that is configured to penetrate the threaded portion to press the substrate against a lower end portion of the base member.

4. The apparatus of claim 1, wherein the angle-sided member is configured to include a manually adjustable internal angle.

5. The apparatus of claim 1, wherein the angle-sided member is configured to include an automatically adjustable internal angle.

6. The apparatus of claim 1, wherein the attachment member comprises a bolt having a cross-handle slideably mounted in a traverse bore through the top end of the attachment member.

7. The apparatus of claim 6, wherein the securing member is a nut used to bias the clip member via the longitudinal flange against the top edge portion of the panel.

8. The apparatus of claim 1, further comprising a second clip member having a second U-shaped member, a second angle-sided member, and a second securing member, wherein the second U-shaped member includes a second longitudinal flange extending laterally outwardly from an upper end of a corresponding second wall, and wherein the second securing member is used to press the second longitudinal flange against a bottom edge portion of the panel.

9. The apparatus of claim 1, wherein the substrate includes a seat, and wherein the incline angle is established by an oblique line connecting a forward edge of a seat arm and a top end of a seat back and a horizontal line sharing a vertical plane with the oblique straight line.

10. The apparatus of claim 1, wherein the longitudinal flange includes teeth that point downward to improve the securing of the panel to the substrate.

* * * * *